United States Patent [19]

Takimoto et al.

[11] Patent Number: 5,439,957
[45] Date of Patent: Aug. 8, 1995

[54] THERMOSETTING COATING COMPOSITION

[75] Inventors: Masaaki Takimoto, Kadoma; Hisataka Yamamoto, Tokyo; Kohichi Kimura, Osaka, all of Japan

[73] Assignee: Nippon Paint Co., Ltd., Osaka, Japan

[21] Appl. No.: 115,045

[22] Filed: Sep. 1, 1993

[30] Foreign Application Priority Data

Sep. 2, 1992 [JP] Japan .................. 4-234743

[51] Int. Cl.⁶ .............................. C08K 5/34
[52] U.S. Cl. .................. 524/101; 106/14.14; 106/14.17; 524/444; 524/446
[58] Field of Search .......... 524/101, 446, 444; 106/14.14, 14.17

[56] References Cited

U.S. PATENT DOCUMENTS

| | | | |
|---|---|---|---|
| 4,677,028 | 6/1987 | Heeringg et al. | 524/101 X |
| 4,786,673 | 11/1988 | Morival et al. | 524/101 |
| 4,863,982 | 9/1989 | Stegmann et al. | 524/101 |
| 5,015,681 | 5/1991 | Steiert et al. | 524/101 |
| 5,037,869 | 8/1991 | Sprenkle, Jr. | 524/101 X |
| 5,073,584 | 12/1991 | Meszaros et al. | 524/101 |
| 5,135,974 | 8/1992 | Moore | 524/101 |
| 5,153,247 | 10/1992 | Okamura et al. | 524/101 |
| 5,204,392 | 4/1993 | Nalepa et al. | 524/101 |
| 5,204,393 | 4/1993 | Nalepa et al. | 524/101 |
| 5,298,059 | 3/1994 | Takimoto et al. | 106/14.17 |

FOREIGN PATENT DOCUMENTS

| | | |
|---|---|---|
| 0046057 | 2/1982 | European Pat. Off. . |
| 0150741 | 8/1985 | European Pat. Off. . |
| 0307996 | 3/1989 | European Pat. Off. . |
| 0486476 | 5/1992 | European Pat. Off. . |
| 0506485 | 9/1992 | European Pat. Off. . |
| 59/149955 | 8/1983 | Japan . |
| 62-57470 | 3/1987 | Japan . |
| 63-123472 | 5/1988 | Japan . |
| 1-167381 | 7/1989 | Japan . |
| 2-149699 | 6/1990 | Japan . |
| 3-28277 | 2/1991 | Japan . |

*Primary Examiner*—Judy M. Reddick
*Attorney, Agent, or Firm*—Burns, Doane, Swecker & Mathis

[57] ABSTRACT

A thermosetting coating composition suitable for use in the production of coated and precoated metals comprises (A) a thermosetting resin-hardener mixture which is a mixture of at least one base resin and at least one hardener, (B) an aluminum silicate colloid which is a mixture of $Al_2O_3$ or $Al(OH)_3$ with $SiO_2$, (C) a melamine cyanurate compound, and (D) a solvent in such an amount that the composition has a viscosity adequate for coating. Optionally a pigment and/or lubricant may be added.

20 Claims, 1 Drawing Sheet

● =CORBON   ○ =NITROGEN   ⊙ =OXYGEN   • =HYDROGEN

THERMOSETTING COATING COMPOSITION

BACKGROUND OF THE INVENTION

The present invention relates to a thermosetting coating composition. More particularly, it pertains to a thermosetting coating composition capable of forming an organic film with excellent anticorrosion properties which contains an inorganic cation-exchanger and which is suitable for use in the production of precoated metals (PCM).

Precoated metals, which are mainly used in the automobile and electrical appliance industries, are required to have various properties. For example, they should have not only good anticorrosive properties and weathering resistance but also good press formability and improved productivity in the preparation and application of coating. Furthermore, it is desirable that precoated metals or the production thereof should not cause environmental (air, water, etc.) pollution.

Many coating compositions which have been used to form an anticorrosive coated film in the production of precoated metals, particularly precoated anticorrosive steel sheets, contain a chromium (VI) compound which forms a corrosion-resistant passive film on the substrate metal. However, such coating compositions have the problem that elution of toxic chromium from the resulting coated film inevitably occurs, thereby causing water pollution. Furthermore, the coated film from which chromium has been eluted has a greatly degraded level of anticorrosion power and therefore is not expected to exhibit long-lasting anticorrosive properties.

In order to avoid water pollution caused by chromium-containing coating compositions, there is a need of developing chromium-free coating compositions. One class of such coating compositions contains silica ($SiO_2$) and/or other metal oxides in the form of fine or colloidal particles in place of a chromium (VI) compound, as described in Japanese Patent Applications Laid-Open Nos. 62-57470(1987), 63-123472(1988), and 1-167381(1989), and European Patent Application Publication No. 0 307 996.

However, the anticorrosion power of these silica-containing coating compositions is unsatisfactorily lower than that of conventional chromium-containing coating compositions. Therefore, it is still desired to develop a chromium-free coating composition having a satisfactory level of anticorrosive properties which are comparable to those of chromium-containing compositions.

It has been proposed to incorporate a melamine cyanurate compound, which is an adduct of melamine and cyanuric acid, into a coating formed on steel sheets. Japanese Patent Application Laid-Open No. 2-149699(1990) discloses a steel sheet having an electroplated coating of zinc or a zinc alloy which is formed from a zinc or zinc alloy plating bath containing a melamine cyanurate compound dispersed therein.

Japanese Patent Application Laid-Open No. 3-28277(1991) discloses a metallic finish coating in which a melamine cyanurate compound is added to the uppermost clear layer in order to provide the metallic finish coating with an attractive pearlescent appearance similar to that of pearlescent coatings.

However, it has not been proposed to use a melamine cyanurate compound in inorganic particle-containing, organic resin-based coating compositions, particularly for use in the production of precoated metals.

SUMMARY OF THE INVENTION

It is an object of the present invention to provide a chromium-free, thermosetting coating composition having improved anticorrosive properties.

Another object of the present invention is to provide such a coating composition which can be used in the production of precoated metals and for coating of steel or other substrates without causing environmental pollution.

A further object of the invention is to provide a thermosetting coating composition capable of forming a cured coated film having good electrodeposition coatability.

It has been found that the above objects can be accomplished by a thermosetting coating composition comprising (A) a thermosetting resin-hardener mixture which is a mixture of at least one base resin and at least one hardener, (B) an aluminum silicate colloid, (C) a melamine cyanurate compound, and (D) a solvent in such an amount that the composition has a viscosity adequate for coating.

These and other objects, as well as the nature, advantages, and utilization of the present invention will be apparent to those skilled in the art from the following detailed description.

DETAILED DESCRIPTION OF THE INVENTION

Figure 1:
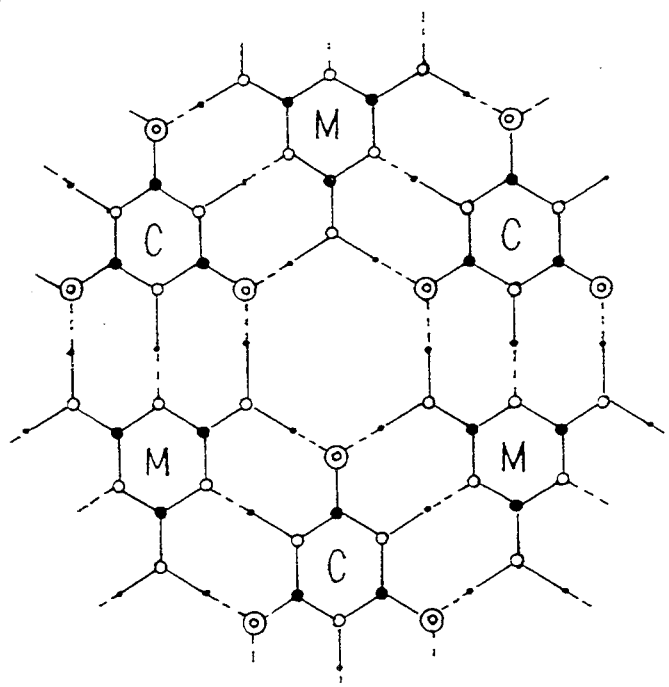
FIGS. 1 and 2 are schematic illustrations showing the structure of a melamine cyanurate compound.

Preferably, the thermosetting coating composition according to the present invention contains, on a solids basis, from about 30% to about 90% by weight of a resin-hardener mixture (A), from about 2% to about 40% by weight of an aluminum silicate colloid (B), and from about 0.05% to about 30% by weight of a melamine cyanurate compound (C), based on the total solids of the coating composition. In component (A), the base resin is present in a proportion of from about 20% to about 80% by weight and the hardener is present in a proportion of from about 5% to about 30% by weight based on the total solids of the composition.

More preferably, the coating composition contains from about 50% to about 80% by weight of the resin-hardener mixture (A), from about 10% to about 30% by weight of colloid (B), and from about 0.5% to about 20% by weight of compound (C), and the base resin and the hardener comprise from about 25% to about 70% and from about 10% to about 25% by weight, respectively, based on the total solids of the coating composition. Most preferably, the proportions of colloid (B) and compound (C) are from about 15% to about 25% by weight and from about 1% to about 10% by weight, respectively.

When the proportion of the resin-hardener mixture (A) does not fall within the range of 30–90% by weight, the resulting cured coated film may not exhibit good anticorrosive properties. A proportion of the aluminum silicate colloid (B) of less than 2% by weight also tends to cause a decrease in anticorrosive properties. The presence of colloid (B) in a proportion of more than 40% by weight tends to cause the resulting cured coated film to have degraded resistance to water and to pretreating solutions. The melamine cyanurate compound (C), when present in a proportion of less than 0.05% by weight, tends to cause a degradation in electrodeposition coatability and anticorrosive properties, while the presence of compound (C) in a proportion of more than 30% by weight tends to decrease the anticorrosive properties.

It is an important feature of the invention that the thermosetting coating composition contains the aluminum silicate colloid (B) in combination with the melamine cyanurate compound (C).

The aluminum silicate colloid (B) is a mixture of alumina ($Al_2O_3$) or aluminum hydroxide [$Al(OH)_3$] with silica ($SiO_2$) and can be prepared in the following manner.

Ammonium hydroxide is dissolved in water, preferably in deionized water to form an aqueous alkaline solution which preferably has a pH of approximately 10. A powder of $Al_2O_3$ or $Al(OH)_3$ is added to the alkaline solution and aged for 6-48 hours at a temperature of from room temperature to 80° C. to give a colloidal solution of $Al_2O_3$ or $Al(OH)_3$. It is, of course, possible to use a mixture of $Al_2O_3$ and $Al(OH)_3$. Preferably, an $Al(OH)_3$ powder is used since it forms a colloidal solution more easily than does $Al_2O_3$. In the resulting colloidal solution, the following equilibrium:

$$Al_2O_3 + 3H_2O \rightleftharpoons 2Al(OH)_3$$

is established. Accordingly, $Al_2O_3$ and $Al(OH)_3$ are equivalent to each other in the formation of the colloidal solution and 1 mole of $Al_2O_3$ corresponds to 2 moles of $Al(OH)_3$.

The aluminum silicate colloid is prepared by mixing the thus-formed colloidal solution of $Al_2O_3$ or $Al(OH)_3$ with colloidal silica ($SiO_2$) in such a proportion that the molar ratio of $Al_2O_3/SiO_2$ is between 6/1 and 3/5 and preferably between 6/3 and 5/5 or the molar ratio of $Al(OH)_3/SiO_2$ is between 12/1 and 12/10 and preferably between 12/2 and 12/5. The colloidal silica may be either fumed silica or silica sol.

When present in a coating composition, the aluminum silicate colloid, which is a mixture of $Al_2O_3$ or $Al(OH)_3$ with $SiO_2$, forms a halloysite-like cation-exchanger during baking of a wet coated film of the composition applied to a substrate such as a steel sheet. The thus-formed cation exchanger having a structure analogous to halloysite contributes to improved anticorrosive properties of the coated film.

For this purpose, attention should be given to the purity of the $Al_2O_3$ or $Al(OH)_3$ and $SiO_2$ used as starting materials in the preparation of the aluminum silicate colloid. An $Al_2O_3$ or $Al(OH)_3$ powder is often contaminated with $Fe_2O_3$, $SiO_2$, $Na_2O$, $MgO$, and similar impurities, while colloidal $SiO_2$ often contains impurities such as $Na_2O$ and $Cl_2$. These impurities cause the cation-exchange capacity of the halloysite-like structure to decrease. Therefore, the starting materials used should be as pure as possible in order to fully attain the desired improved anticorrosive properties.

Moreover, it is preferable that the average particle diameter of the colloidal silica ($SiO_2$) used be in the range of from about 1 nm to about 20 nm and more preferably from about 2 nm to about 10 nm in order to achieve good cation exchange capacity. Examples of commercially-available products of such a colloidal silica are Snowtex OUP (silica sol sold by Nissan Kagaku) and Aerosil 300 and Aerosil MOX170 (both fumed silica sold by Nippon Aerosil).

Corrosion of coated steel sheets including precoated steel sheets is caused by the mechanism that corrosion-promoting substances (ions and molecules) such as $Cl^-$, $O_2$, and $H_2O$ penetrate through the coated film to reach the substrate steel (or a Zn- or Zn alloy-plated coating, if the substrate is plated with Zn or a Zn alloy) and they chemically react with metals such as Fe, Ni, Cr, and (Zn) present in the substrate.

When NaOH, NaCl, or similar substance penetrates into the cured coated film, it is presumed that the halloysite-like cation exchanger formed in the film from the aluminum silicate colloid performs ion exchange reactions with various cations as exemplified by the following formulas (1) and (2) so as to prevent $Cl^-$ and $H_2O$ from penetrating through the coated film:

$$R^-H^+ + Na^+ + OH^- \rightarrow R^-Na^+ + H^+ + OH^- \quad (1)$$

$$R^-H^+ + Na^+ + Cl^- \rightarrow R^-Na^+ + H^+ + Cl^- \quad (2)$$

where $R^-H^+$ stands for a cation exchanger.

Oxygen ($O_2$) molecules have a high electronegativity and it is considered that such molecules cannot penetrate the coated film easily since they are repelled by the cation exchanger. As a result, the coated film containing the cation exchanger exhibits particularly improved anticorrosive properties in air or even-in corrosive environments since it is capable of inhibiting penetration of corrosion-promoting substances such as $Cl^-$, $O_2$, and $H_2O$ through the film.

In addition to such improved anticorrosive properties, precoated metals are required to have good electrodeposition coatability with an electrodeposition primer, which is usually applied before finish coating. The expression "good electrodeposition coatability" used herein indicates that a precoated metal can be covered by electrodeposition with a uniform film which is substantially free from orange peel or gas pinholes.

In order to obtain good electrodeposition coatability, the coating composition according to the present invention contains a melamine cyanurate compound in addition to the aluminum silicate colloid.

Figure 2:
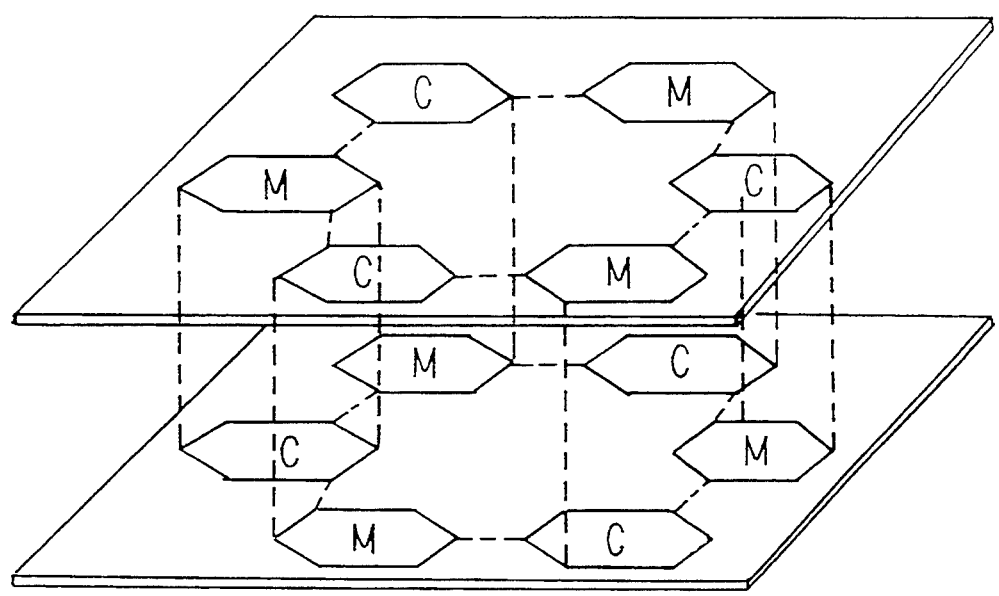

The melamine cyanurate compound used in the present invention has the chemical formula: ($C_6H_9N_9O_3$). Specifically, it is an equimolar adduct of 2,4,6-triamino-1,3,5-triazine (melamine) and 2,4,6-trihydroxy-1,3,5-triazine (cyanuric acid) and/or its tautomer. In the solid state, the melamine cyanurate compound is presumed to form crystals of a graphite-like layer structure in which layers each having a planar structure as shown in FIG. 1 are stacked with a constant interplanar spacing as shown in FIG. 2. It is also assumed that each layer is formed by combining melamine molecules and cyanuric acid molecules alternately by weak hydrogen bonding, as shown in FIG. 1. In FIGS. 1 and 2, "C" and "M" denote a cyanuric acid molecule and a melamine molecule, respectively.

The melamine cyanurate compound can be prepared by adding dropwise an aqueous solution of melamine to an aqueous solution of cyanuric acid with stirring such that the cyanuric acid is always present in excess in the resulting mixture and collecting the precipitated white crystals followed by washing with water and methanol, in accordance with the method described in Japanese Patent Publication No. 60-33850(1985). Alternatively, it can be commercially available under the tradenames MC series, e.g., MC-FW, MC-PW, MC-BW, MC-UW, MC-101, MC-420, MC-520, and MC-600, from Nissan Kagaku, and under the tradename MCA from Mitsubishi Yuka.

The melamine cyanurate compound has good resistance to acids and alkalis and remains stable with no chemical change throughout the pH range of from 1 to 14. When cationic electrodeposition coating is applied to a precoated metal, the precoated metal is exposed to a solution having a pH as high as pH 12 and the adhesion between the substrate metal and the lowermost organic coating formed thereon tends to be broken by the action of the electrical loading applied during electrodeposition. The outstanding stability of the melamine cyanurate compound over a wide pH range has the effect of preventing such breakage of adhesion.

Apart from the aluminum silicate colloid and the melamine cyanurate compound, the other components in the coating composition of the present invention are not restricted to specific ones.

The thermosetting resin-hardener mixture (A) consists of at least one base resin and at least one hardener, each of which can be selected from those conventionally employed in the field of thermosetting or baking-type coating compositions. Preferably, the thermosetting resin-hardener mixture is selected such that curing of the mixture occurs at a temperature of 100° C. or above. Also it is preferable that both the base resin and the hardener be water-soluble or water-dispersible.

Non-limiting examples of base resins suitable for use in the present invention include acrylic and methacrylic resins, polyester resins, alkyd resins, epoxy resins, and polyurethane resins, while non-limiting examples of useful hardeners include amino resins such as melamine resins and benzguanamine resins, isocyanates and blocked isocyanates, amines, phenolic resins, and adducts of a nitrogen-containing cyclic compound such as an aliphatic heterocyclic diamine and a glycidyl ether.

The coating composition of the present invention may optionally contain at least one pigment selected from those conventionally employed in the field of coatings and paints depending on the end use thereof. Examples of useful pigments include various inorganic or organic color pigments such as titanium dioxide, iron oxide (red or yellow), carbon black, chrome yellow, phthalocyanine blue, phthalocyanine green, and quinacridone pigments; extender pigments such as precipitated calcium carbonate and barium sulfate, kaolin, talc, clay, and white carbon; anticorrosive, rust-preventing pigments such as zinc phosphate, aluminum phosphate, calcium phosphate, and a mixture of zinc dust and glass flakes; special pigments such as flaky aluminum pastes for producing metallic colors, pearlescent pigments such as titanium dioxide-coated mica powder, and various luminescent pigments including fluorescent pigments; and antifouling pigments such as cuprous oxide.

Another optional component is a lubricant, which may be present, if necessary, in the coating composition in order to improve the lubricating properties of the cured coated film formed from the composition, thereby improving the press formability of the resulting precoated metal. Examples of useful lubricants are solid lubricants such as polyethylene powder, fluorinated polyethylene powder, and molybdenum disulfide.

The proportions of pigment and lubricant, if one or both are present, are not greater than about 50% and preferably not greater than about 25% by weight for the pigment, and not greater than about 30% and preferably not greater than about 5% by weight for the lubricant, based on the total solids of the coating composition. The total concentration of pigment and solid lubricant, if both present, should not exceed the critical pigment volume concentration (CPVC).

The solvent (D) is preferably a mixture of water with one or more hydrophilic organic solvents. Useful hydrophilic organic solvents includes alcohols such as methyl alcohol, ethyl alcohol, isopropyl alcohol, butyl alcohol, isobutyl alcohol, 2-butyl alcohol, benzyl alcohol, and cyclohexanol; ethers such as butyl cellosolve and cellosolve acetate; and a mixture of these.

Other organic solvents conventionally employed in the field of coatings and paints may be used to constitute part of the solvent (D) in the coating composition. Examples of these organic solvents include optionally halogenated aromatic hydrocarbons such as benzene, toluene, xylene, ethylbenzene, and chlorobenzene; optionally halogenated aliphatic hydrocarbons such as cyclohexane, ethylcyclohexane, and perchloroethylene; esters such as ethyl acetate, butyl acetate, and isobutyl acetate; ketones such as acetone, methyl ethyl ketone, methyl isobutyl ketone, cyclohexanone, isophorone, and diacetone alcohol; carbitol acetate, dioxane, tetrahydrofuran, dimethylformamide, nitropropane, styrene, mineral spirits, and a mixture of these.

The solvent is used in such an amount that the composition has a viscosity adequate for coating, which varies depending on the coating technique employed. Usually, the amount of the solvent is between about 300 and about 500 parts, preferably between about 350 and about 450 parts, and most preferably approximately 400 parts by weight for each 100 parts by weight of total solids in the composition.

The thermosetting coating composition of the present invention may further contain other additives conventionally employed in the field of coatings and paints. Examples of such optional additives include hardening promoters and catalysts such as dodecylbenzenesulfonic acid, ultraviolet absorbers such as benzophenone and benzotriazole compounds, antioxidants such as phenolic and sulfide compounds, surface modifiers such as silicones and organic polymers, antisagging agents, thickening agents, and the like. These additives may be present in the coating composition in a total amount of not greater than 5% by weight based on the total solids of composition in order to improve or modify the properties of the coating composition or cured coated films prepared therefrom. The presence of these additives in a higher amount is not desirable since cissing or crawling may occur in the formation of a coated film or intercoat adhesion may be degraded, which are often encountered with conventional coating compositions.

When it is desired that the anticorrosion properties of the coating composition be especially improved depending on the end use of the coated substrate, a small amount of a chromium (VI) compound may be added to the coating composition so as to form a passive film on the surface of the substrate metal. Useful chromium (VI) compounds include ammonium chromate, ammonium dichromate, barium chromate, strontium chromate, and magnesium chromate.

In the circumstances where the presence of a chromium (VI) compound along with the aluminum silicate colloid presents a problem, only the aluminum silicate should be used to improve the anticorrosive properties of the coating composition. It is a major advantage of the invention that when the coating composition is free from a chromium (VI) compound, the resulting cured coated film has improved anticorrosion properties comparable to a conventional chromium (VI)containing composition due to the presence of the cation exchanger formed from the aluminum silicate colloid, thereby eliminating environmental pollution caused by a chromium (VI) compound.

The thermosetting coating compositions of the present invention may be referred to as paints, lacquers, anticorrosive primers, or the like. For each of the essential and optional components, one or more substances may be used.

The coating composition can be prepared by thoroughly mixing the components and, if necessary, dispersing particulate components such as a pigment and/or lubricant by means of a conventional mixing or dispersing device such as a dissolver, ball mill, or sand grind mill, which is commonly employed in the preparation of paints and coatings. The presence of the aluminum silicate colloid (B) along with the resin-hardener mixture in the form of an aqueous solution or emulsion, for example, makes it difficult for sedimentation of the other particulate components present therein such as melamine cyanurate and pigments to occur. Therefore, there is usually no need of dispersing the solid components in the composition by vigorous agitation. On the contrary, vigorous agitation for dispersion should be avoided when the base resin is present in an aqueous emulsion, since it may cause the aqueous emulsion to break down, resulting in the formation of a coated film having degraded properties. Therefore, the productivity of the preparation of the coating composition can be improved by elimination of a dispersing step.

The thermosetting coating composition of the present invention can be applied to various substrates. The substrate to be used is mainly selected from cold-rolled steel sheets or plates and zinc-plated steel sheets or plates (including those plated with a zinc-based alloy such as Zn-Fe, Zn-Al, Zn-Mn, Zn-Co, Zn-Ni, Zn-Ni-Cr, or Zn-Ni-Co). However, it is possible to use other substrates, which include electrically conductive materials such as sheets or plates of stainless steel, copper, and brass, as well as non-conductive (insulating) materials such as FRP (fiber-reinforced plastics), polyethylene, polypropylene, polyamides, polyacrylates, polyvinyl chloride, polyvinylidene chloride, polycarbonates, polyurethanes, and various rubbers, which have been modified to be electrically conductive by incorporation of a conductive filler or by coating with a conductive material by means of an appropriate coating technique such as electroless plating. It is also possible to use a laminated or otherwise integrated substrate consisting of a conductive material and a non-conductive material bonded together by adhesion or other securing means. If desired, the substrate may have an electrodeposited coating as an undercoat, which is coated with the coating composition of the invention.

The thermosetting coating composition of the invention can be applied by means of any conventional coating method such as brushing, air spraying, airless spraying, electrostatic spray coating, roll coating, or curtain flow coating. If necessary, the coating composition may be diluted with water or an organic solvent as described above such that the viscosity is decreased to a degree adequate for the coating method employed.

In accordance with the present invention, the presence of the colloid component (B) tends to prevent the formation of hard precipitates. As a result, the coating composition can be readily applied after mild agitation, and when the roll coating method is employed, the roll coating can be performed either by the top feed technique in which a coating composition is fed into the nip between an applicator roll and a pickup roll or by the bottom feed technique in which a coating composition is fed into a coater pan. Namely, it is possible to apply the coating composition by roll coating using the bottom feed technique, which is generally employed in the production of precoated metals.

The substrate coated with the coating composition of the invention is baked at a temperature sufficient to cure the wet film. Therefore, the baking temperature is selected mainly depending on the particular resin-hardener mixture component (A). The baking is usually performed at a temperature above 100° C. for a relatively short period up to a few minutes. The thickness of the resulting dry coated film is not critical, but it is usually in the range of 0.5–10 μm.

The resulting substrate having a cured coated film of the coating composition of the present invention is suitable for use as a precoated metal without finish coating, since it has not only improved anticorrosive properties which are mainly attributable to the presence of the aluminum silicate colloid but also improved lubricating properties (press formability) which are mainly attributable to the presence of the melamine cyanurate compound and a lubricant (if used).

Alternatively, the coated substrate may be further subjected to electrodeposition coating and/or finish coating (intermediate and top coating) before or after press forming. The presence of the melamine cyanurate compound provide the coated film with improved electrodeposition coatability, and it is possible to electrodeposit thereon a uniform coating which is free from gas pinholes and which has a smooth surface.

Therefore, the substrate coated or precoated with the coating composition of the present invention is useful in the manufacture of automobile bodies, electrical appliance housings, building panels, and the like.

The following examples are presented to further illustrate the present invention. These examples are to be considered in all respects as illustrative and not restrictive. In the examples, all percents and parts are by weight unless otherwise indicated and are expressed as solids as long as they denote a proportion of a component.

EXAMPLES

Examples 1–17 and Comparative Examples 1–4

The materials used to prepare coating compositions in these examples were as follows:

Al(OH)$_3$ powder: Hydirite H42 (Showa Denko);
Colloidal silica (SiO$_2$ sol): Snowtex OUP (Nissan Kagaku, average particle diameter: 20 nm);
Base resins:
    (1) Eporsion EA55 (Kanebo NSC), an aqueous emulsion of an epoxy resin having an epoxy equivalent weight of about 950;
    (2) Eporsion HC25 (Kanebo NSC), an aqueous emulsion of an epoxy resin having an epoxy equivalent weight of about 1950;
    '(3) Hitaloid H7810 (Hitachi Kasei), an aqueous emulsion of a modified epoxy resin having an epoxy equivalent weight of about 1800;
    (4) Adeka Bontiter HUX232 (Asahi Denka), an aqueous emulsion of a polyurethane resin;

Hardener: Eporsion HD51B (Kanebo NSC, a cyclic amine-glycidyl ether adduct);
Melamine cyanurate: MC 101 (Nissan Kagaku);

determine the percent area of the surface covered with red rust.

The results are also included in Table 1.

TABLE 1

| Example No. | Al(OH)$_3$ (Weight parts) | SiO$_2$ (Weight parts) | Al(OH)$_3$/SiO$_2$ Molar ratio | Base resin Name[1] | Hardener (Weight parts) | Melamine cyanurate[2] (Weight parts) | Results of CCT[3] |
|---|---|---|---|---|---|---|---|
| Example 1 | 15.9 | 4.1 | 6/2 | (1) | 61.6 | 15.4 | 3 | 0/0 |
| Comp. Ex. 1 | 20.0 | — | — | (1) | 61.6 | 15.4 | 3 | 60/100 |
| Comp. Ex. 2 | — | 20.0 | — | (1) | 61.6 | 15.4 | 3 | 45/100 |
| Example 2 | 15.9 | 4.1 | 6/2 | (2) | 61.6 | 15.4 | 3 | 0/0 |
| Comp. Ex. 3 | 20.0 | — | — | (2) | 61.6 | 15.4 | 3 | 50/100 |
| Comp. Ex. 4 | — | 20.0 | — | (2) | 61.6 | 15.4 | 3 | 45/100 |
| Example 3 | 15.9 | 4.1 | 6/2 | (3) | 61.6 | 15.4 | 3 | 0/0 |
| Example 4 | 15.9 | 4.1 | 6/2 | (4) | 63.9 | 16.0 | 0.1 | 0/0 |
| Example 5 | 15.9 | 4.1 | 6/2 | (3) | 63.2 | 15.8 | 1 | 0/0 |
| Example 6 | 15.9 | 4.1 | 6/2 | (3) | 56.0 | 14.0 | 10 | 0/0 |
| Example 7 | 1.6 | 0.4 | 6/2 | (3) | 76.0 | 19.0 | 3 | 0/0 |
| Example 8 | 8.0 | 2.0 | 6/2 | (4) | 70.0 | 17.0 | 3 | 0/0 |
| Example 9 | 31.8 | 8.2 | 6/2 | (1) | 24.0 | 6.0 | 30 | 0/0 |
| Example 10 | 16.8 | 3.2 | 8/2 | (1) | 61.6 | 15.4 | 3 | 0/0 |
| Example 11 | 11.3 | 8.7 | 5/5 | (1) | 61.6 | 15.4 | 3 | 0/0 |
| Example 12 | 13.2 | 6.8 | 6/4 | (1) | 61.6 | 15.4 | 3 | 0/0 |
| Example 13 | 18.6 | 1.4 | 10/1 | (1) | 61.6 | 15.4 | 3 | 0/0 |
| Example 14 | 12.6 | 7.4 | 3/2 | (1) | 61.6 | 15.4 | 3 (Pig. 2) | 0/0 |
| Example 15 | 14.4 | 5.6 | 3/2 | (2) | 61.6 | 15.4 | 3 (Pig. 2) | 0/0 |
| Example 16 | 18.2 | 1.8 | 6/1 | (3) | 61.6 | 15.4 | 2 (Pig. 2) | 0/0 |
| Example 17 | 10.1 | 9.9 | 3/5 | (4) | 61.6 | 15.4 | 3 | 0/0 |

(Notes)
[1]Base resin -
(1) Eporsion EA55
(2) Eporsion HC25
(3) Hitaloid H7810
(4) Adeka Bontiter HUX232
[2]Pig. = Color pigment
[3]Results of CCT: % Area covered with red rust after 50 cycles/after 200 cycles Color pigment: Firstgen Super-red 7061BT (Dai-Nippon Ink).

An aluminum silicate colloid was prepared by adding the Al(OH)$_3$ powder to an aqueous NH$_4$OH solution at a pH of 10 and aging the mixture for 24 hours at 60° C. The colloidal silica (silica sol) was added to the colloidal solution with stirring in such an amount that the Al(OH)$_3$/SiO$_2$ weight ratio indicated in Table 1 was obtained. The resulting aluminum silicate colloid had a solids content in the range of 15–25%.

Coating compositions were prepared by mixing one of the above base resins with the aluminum silicate colloid, the above-described hardener, melamine cyanurate, a ketone solvent, and optionally color pigment using a sand grind mill in the proportions indicated in Table 1 and diluting the mixture with water to a total solids content of approximately 20%.

A 0.8 mm-thick steel sheet having a plated coating of a Zn-Ni alloy at a coating weight of 30 g/m$^2$ on each side was degreased with trichloroethylene and coated on one surface with one of the coating compositions prepared above to a dry thickness of 0.8–1.0 μm by means of a bar coater. The coated steel sheet was then baked for 20 seconds at 150 ° C. as the highest metal temperature (HMT) to give a coated steel sheet.

The anticorrosion properties of the resulting coated steel sheets were evaluated by the following cyclic corrosion test (CCT).

Cyclic corrosion test (CCT)

A test specimen measuring 7 cm × 15 cm, the edges of which had been sealed, was exposed repeatedly to an 8 hour-cycle consisting of salt spraying with a 5% NaCl solution at 35° C. for 4 hours, drying with hot air at 60° C. for 2 hours, and humidifying at 95% RH and 50 ° C for 2 hours. After 50 cycles and 200 cycles, the coated surface of the test specimen was visually observed to Examples 18–21 and Comparative Examples 5 and 6

The following materials were used in these examples:
Melamine cyanurate: MCA (Mitsubishi Yuka);
Lubricant: Chemipearl W-700 (Mitsui Sekiyu Kagaku, a colloidal dispersion of polyethylene having a number-average molecular weight of about 3000.

The other materials were the same as those used in the preceding examples.

Using these materials, coating compositions having the formulations shown in Table 2 were prepared in the same manner as described in the preceding examples. The resulting compositions were applied to a substrate in the same manner as described in the preceding examples to give coated steel sheets each having a cured coated film of one of the coating compositions on one side.

The anticorrosive properties of the coated steel sheets were evaluated by the cyclic corrosion test (CCT) described above. In addition, each coated steel sheet was also evaluated with respect to resistance to xylene rubbing, electrodeposition coatability, and press formability in the following manner.

Resistance to xylene rubbing

The coated surface of each test specimen was rubbed 20 times with fingers wrapped with 8-layered gauze which had been impregnated with xylene. After rubbing, the presence or absence of rub-off of the coated film was determined by visual observation.

Electrodeposition coatability

A test specimen was subjected to electrodeposition coating with a primer for electrodeposition (Power Top U-600, Nippon Paint) for 2.5 minutes at a bath temperature of 29° C. after the voltage was increased to 170 V over 30 seconds. The electrodeposited coating was baked for 20 seconds at 170° C. The appearance of the resulting electrodeposited coated film was observed visually with respect to orange peel and gas pinholes and evaluated as follows.

Orange peel
X: Apparent orange peel
△: Slight orange peel
○: No orange peel

Gas pinholes
XX: More than one gas pinhole
X: One gas pinhole
○: No gas pinhole

Press formability

A test piece (blank) of each coated steel sheet was subjected to a cupping (deep drawing) test using a punch having a diameter of 50 mm at a punch travelling speed of 100 mm/min to form a cup with the coated surface outside while the blank was held by a blank holder at a pressure of 1000 k/10 m². The press formability was evaluated by the extrusion force in tons required to extrude the punch and by the presence or absence of peeling of the coating, which was determined by visual observation after a transparent adhesive tape was applied to the circumferential surface of the cup and removed.

The test results are shown in Table 3.

It will be appreciated by those skilled in the art that numerous variations and modifications may be made to the above embodiments without departing from the spirit or scope of the invention as broadly described.

TABLE 2

| Example No. | Al(OH)$_3$ (Weight parts) | SiO$_2$ (Weight parts) | Al(OH)$_3$/SiO$_2$ Molar ratio | Base resin Name[1] | Base resin (Weight parts) | Hardener (Weight parts) | Lubricant (Weight parts) | Melamine cyanurate (Weight parts) |
|---|---|---|---|---|---|---|---|---|
| Example 18 | 15.9 | 4.1 | 6/2 | (1) | 61.6 | 15.4 | 2 | 1 |
| Example 19 | 15.9 | 4.1 | 6/2 | (1) | 60.0 | 15.0 | 2 | 3 |
| Comp. Ex. 5 | 15.9 | 4.1 | 6/2 | (1) | 62.4 | 15.6 | 2 | — |
| Example 20 | 15.9 | 4.1 | 6/2 | (2) | 61.6 | 15.4 | 2 | 1 |
| Example 21 | 15.9 | 4.1 | 6/2 | (2) | 60.0 | 15.0 | 2 | 3 |
| Comp. Ex. 6 | 15.9 | 4.1 | 6/2 | (2) | 62.4 | 15.6 | 2 | — |

(Note)
[1]Base resin -
(1) Eporsion EA55
(2) Eporsion HC25

TABLE 3

| Example No. | Resistance to xylene rubbing | Electrodeposition coatability Orange peel | Electrodeposition coatability Gas pinhole | Press formability Extrusion force (ton) | Press formability Peeling | Results of CCT[1] |
|---|---|---|---|---|---|---|
| Example 18 | No rub-off | ○ | ○ | 3.7 | None | 0/0 |
| Example 19 | " | ○ | ○ | 3.5 | " | 0/0 |
| Comp. Ex. 5 | " | x | x | 3.5 | " | 30/90 |
| Example 20 | " | ○ | ○ | 3.6 | " | 0/0 |
| Example 21 | " | ○ | ○ | 3.5 | " | 0/0 |
| Comp. Ex. 6 | " | x | x | 3.6 | " | 25/95 |

(Note)
[1]CCT - % Area covered with red rust after 50 cycles/after 200 cycles

What is claimed is:

1. A thermosetting coating composition comprising
   (A) a thermosetting resin-hardener mixture which is a mixture of at least one thermosetting resin and at least one hardener selected from the group consisting of amino resins, unblocked and blocked isocyanates, amines, phenolic resins, and adducts of a nitrogen-containing cyclic compound and a glycidyl ether,
   (B) an aluminum silicate colloid prepared by mixing colloidal silica (SiO$_2$) with a colloidal solution containing at least one aluminum compound selected from the group consisting of Al$_2$O$_3$ and Al(OH)$_3$,
   (C) a melamine cyanurate compound, and
   (D) a water-containing solvent present in such an amount that the composition has a viscosity adequate for coating.

2. The thermosetting coating composition of claim 1, wherein the thermosetting resin is selected from the group consisting of acrylic and methacrylic resins, polyester resins, alkyd resins, epoxy resins, and polyurethane resins.

3. The thermosetting coating composition of claim 2 wherein the solvent comprises a mixture of water with one or more hydrophilic organic solvents.

4. The thermosetting coating composition of claim 3, which comprises, on a solids basis, from 30% to 90% by weight of a resin-hardener mixture (A), from 2% to 40% by weight of the aluminum silicate colloid (B), and from 0.05% to 30% by weight of the melamine cyanurate compound (C), based on the total solids of the coating composition and further wherein the resin-hardener mixture comprises 20 to 80% by weight of base resin and 5 to 30% by weight of hardener, based on the total solids of the coating composition.

5. The thermosetting coating composition of claim 4, which further comprises at least one pigment in a proportion of not greater than 50% by weight of the total solids of the coating composition.

6. The thermosetting coating composition of claim 4, which further comprises at least one lubricant in a proportion of not greater than 30% by weight of the total solids of the coating composition.

7. The thermosetting coating composition of claim 4, wherein the thermosetting resin is in the form of an aqueous solution or emulsion.

8. A thermosetting coating composition, comprising, on a solids basis,
   (A) from 30% to 90% by weight of a resin-hardener mixture of at least one thermosetting resin and at least one hardener selected from the group consisting of amino resins, unblocked and blocked isocyanates, amines, phenolic resins, and adducts of a nitrogen-containing cyclic compound and a glycidyl ether, wherein the thermosetting resin is present in an amount from 20% to 80% by weight and the hardener is present in an amount from 5% to 30% by weight based on the total solids of the coating composition,
   (B) from 2% to 40% by weight of an aluminum silicate colloid, (C) from 0.05% to 30% by weight of a melamine cyanurate compound (C),
(D) from 0% to 50% by weight of a pigment,
(E) from 0% to 30% by weight of a lubricant, and
(F) a water-containing solvent present in such an amount that the composition has a viscosity adequate for coating, wherein each percent is based on the total solids of the coating composition.

9. The thermosetting coating composition of claim 8, wherein the thermosetting resin is selected from the group consisting of acrylic and methacrylic resins, polyester resins, alkyd resins, epoxy resins, and polyurethane resins.

10. The thermosetting coating composition according to claim 9 wherein the solvent comprises a mixture of water with one or more hydrophilic organic solvents.

11. The thermosetting coating composition of claim 10, wherein the thermosetting resin is in the form of an aqueous solution or emulsion.

12. The thermosetting coating composition of claim 10, wherein the resin-hardener mixture (A) comprises from 50% to 80% by weight of the total solids and further wherein the thermosetting resin is present in an amount of 25% to 75% by weight and the hardener is present in an amount of 10% to 25% by weight based on the total solids of the coating composition.

13. The thermosetting coating composition of claim 10, wherein the aluminum silicate colloid (B) is present in an amount of from 10% to 30% by weight, as solids, of the total solids of the coating composition.

14. The thermosetting coating composition of claim 10, wherein the aluminum silicate colloid (B) is present in an amount from 15% to 25% by weight, as solids, of the total solids of the coating composition.

15. The thermosetting coating composition of claim 10, wherein the melamine cyanurate compound (C) is present in an amount of from 0.5% to 20% by weight of the total solids of the coating composition.

16. The thermosetting coating composition of claim 10, wherein the melamine cyanurate compound (C) is present in an amount of from 1% to 10% by weight of the total solids of the coating composition.

17. The thermosetting coating composition of claim 10, wherein the aluminum silicate colloid (B) has a molar ratio of $Al_2O_3/SiO_2$ between 6/1 and 3/5.

18. The thermosetting coating composition of claim 10, wherein the aluminum silicate colloid (B) has a molar ratio of $Al_2O_3/SiO_2$ between 6/3 and 5/5.

19. The thermosetting coating composition of claim 10, wherein the aluminum silicate colloid (B) has a molar ratio of $Al(OH)_3/SiO_2$ between 12/1 and 12/10.

20. The thermosetting coating composition of claim 10, wherein the aluminum silicate colloid (B) has a molar ratio of $Al(OH)_3/SiO_2$ between 12/2 and 12/5.

* * * * *

UNITED STATES PATENT AND TRADEMARK OFFICE
CERTIFICATE OF CORRECTION

PATENT NO. : 5,439,957
DATED : August 8, 1995
INVENTOR(S) : Masaaki TAKIMOTO et al It is certified that error appears in the above-indentified patent and that said Letters Patent is hereby corrected as shown below:

On the title page,

Item [73], add -- and Sumitomo Metal Industries, Ltd., Osaka, Japan --.

Signed and Sealed this

Twenty-sixth Day of March, 1996

Attest:

BRUCE LEHMAN

Attesting Officer     Commissioner of Patents and Trademarks